US011799182B2

(12) United States Patent
Murofushi et al.

(10) Patent No.: US 11,799,182 B2
(45) Date of Patent: Oct. 24, 2023

(54) HIGH-FREQUENCY TRANSMISSION LINE, RADAR APPARATUS PROVIDED WITH HIGH-FREQUENCY TRANSMISSION LINE, AND WIRELESS DEVICE

(71) Applicants: FURUKAWA ELECTRIC CO., LTD., Tokyo (JP); FURUKAWA AUTOMOTIVE SYSTEMS INC., Shiga (JP)

(72) Inventors: Noritaka Murofushi, Tokyo (JP); Hikaru Nakajima, Tokyo (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 653 days.

(21) Appl. No.: 16/978,536

(22) PCT Filed: Nov. 7, 2018

(86) PCT No.: PCT/JP2018/041278
§ 371 (c)(1),
(2) Date: Sep. 4, 2020

(87) PCT Pub. No.: WO2019/171658
PCT Pub. Date: Sep. 12, 2019

(65) Prior Publication Data
US 2021/0021010 A1 Jan. 21, 2021

(30) Foreign Application Priority Data
Mar. 9, 2018 (JP) .................................. 2018-043300

(51) Int. Cl.
*H01Q 1/50* (2006.01)
*H01P 3/08* (2006.01)
(Continued)

(52) U.S. Cl.
CPC .................. *H01P 3/08* (2013.01); *G01S 7/03* (2013.01); *G01S 7/032* (2013.01); *G01S 13/34* (2013.01); *H01Q 1/50* (2013.01)

(58) Field of Classification Search
CPC ... H01Q 1/50; H01P 3/08; G01S 13/34; G01S 7/032; G01S 7/03
(Continued)

(56) References Cited

U.S. PATENT DOCUMENTS 4,494,083 A   1/1985  Josefsson et al.
7,705,695 B2 * 4/2010  Kushta ................ H05K 1/0222
                                                            333/204
(Continued)

FOREIGN PATENT DOCUMENTS

CN   106537684 A   3/2017
CN   107710406 A   2/2018
(Continued)

OTHER PUBLICATIONS

International Search Report dated Jan. 8, 2019 in PCT/JP2018/041278 filed on Nov. 7, 2018, 2 pages.
(Continued)

*Primary Examiner* — Hai V Tran
(74) *Attorney, Agent, or Firm* — Oblon, McClelland, Maier & Neustadt, L.L.P.

(57) ABSTRACT

The high-frequency transmission line is configured by stacking conductor layers and an insulating layer, and is provided with: a signal via, which extends in a stacking direction and electrically connects the conductor layers together; an input line, which is arranged in one of the conductor layers and inputs an electrical signal to the signal via; a signal line, which is arranged in another one of the conductor layers and is connected to the input line through the signal via; a ground plane, which is arranged in any one of the conductor layers;
(Continued)

a conductor arm arranged within a separation region that separates the signal via and the ground plane; and a conductor connection arranged within the separation region and connecting the conductor arm and the ground plane. The conductor arm and the conductor connection are configured to suppress an electrical signal of a predetermined frequency within an electrical signal.

14 Claims, 13 Drawing Sheets

(51) Int. Cl.
  *G01S 13/34* (2006.01)
  *G01S 7/03* (2006.01)
(58) Field of Classification Search
  USPC .................................................. 343/905
  See application file for complete search history.

(56) References Cited

U.S. PATENT DOCUMENTS

| | | |
|---|---|---|
| 2002/0130737 A1 | 9/2002 | Hreish et al. |
| 2003/0080835 A1 | 5/2003 | Hreish et al. |
| 2003/0080836 A1 | 5/2003 | Nagaishi et al. |
| 2005/0030231 A1 | 2/2005 | Nagaishi et al. |
| 2005/0190614 A1* | 9/2005 | Brunette .............. H05K 1/0251 365/192 |
| 2006/0125573 A1* | 6/2006 | Brunette .............. H05K 1/0251 333/33 |
| 2008/0093112 A1 | 4/2008 | Kushta |
| 2010/0134376 A1 | 6/2010 | Margomenos et al. |
| 2012/0119853 A1* | 5/2012 | Kushta .............. H05K 1/0251 333/204 |
| 2014/0077896 A1* | 3/2014 | Lee .......................... H03H 7/17 333/185 |
| 2017/0149111 A1 | 5/2017 | Yosui et al. |
| 2017/0324391 A1* | 11/2017 | Kuo ..................... H05K 1/0251 |
| 2018/0092201 A1 | 3/2018 | Otsubo et al. |

FOREIGN PATENT DOCUMENTS

| | | |
|---|---|---|
| JP | 2001-144511 A | 5/2001 |
| JP | 2003-133801 A | 5/2003 |
| JP | 2007-158675 A | 6/2007 |
| JP | 2008-507858 A | 3/2008 |
| JP | 2012-533912 A | 12/2012 |
| JP | 2013-247619 A | 12/2013 |
| JP | 2015-2454 A | 1/2015 |
| JP | 2017-201680 A | 11/2017 |
| WO | WO 2017/155604 A1 | 9/2017 |

OTHER PUBLICATIONS

Combined Chinese Office Action and Search Report dated Apr. 22, 2021 in Chinese Patent Application No. 201880090743.9 (with unedited computer generated English translation), 13 pages.

Extended European Search Report dated Mar. 19, 2021 in European Patent Application No. 18908876.8, 9 pages.

* cited by examiner

HIGH-FREQUENCY TRANSMISSION LINE, RADAR APPARATUS PROVIDED WITH HIGH-FREQUENCY TRANSMISSION LINE, AND WIRELESS DEVICE

TECHNICAL FIELD

The present invention relates to a high-frequency transmission line formed using a board and also relates to a radar device and a wireless device each including the high-frequency transmission line.

BACKGROUND ART

Multilayer (printed wiring) boards are conventionally used for the purpose of, for example, increasing wiring density, reducing wire-to-wire distance for high transmission speed, and reducing manufacturing costs. A multilayer board is a board in which vias (also called through holes) are formed by stacking wiring boards, forming holes extending between layers, and plating its inner surfaces so as to conduct between the layers. Multilayer boards are widely used in various electronic devices.

When mounted on a multilayer board, high-frequency oscillation sources such as high-frequency ICs can often generate unwanted waves such as secondary harmonics in addition to desired waves. If such unwanted high-frequency components are transmitted through a high-frequency transmission line on a multilayer board, for example, unwanted radiation can be generated from an antenna connected to the transmission line. If an amount of the unwanted radiation is large, it may cause a malfunction of the product itself and other products, or it may not satisfy the Radio Law to hinder commercialization.

Under such circumstances, a technique is proposed in which a band-rejection filter that does not allow passage of unwanted wave frequency band is connected as a separate component to a multilayer board or a desired frequency band-rejection characteristic is imparted to a multilayer board itself. For example, Patent Document 1 discloses a high-frequency transmission line having an additional conducting via that is provided between a signal via for transmitting a signal and a ground via connected to the ground potential (GND) to prevent the signal via from transmitting unwanted waves of a specific frequency.

Patent Document 1: Japanese Unexamined Patent Application, Publication No. 2007-158675

DISCLOSURE OF THE INVENTION

Problems to be Solved by the Invention

The high-frequency transmission line disclosed in Patent Document 1 has a conducting via length that is adjusted so as to adjust the frequency band in which transmission is to be suppressed during transmission of signals through the multilayer board. For adjustment to a high frequency band, however, the length of the conducting via needs to be extremely short, which makes the manufacturing process difficult.

When plural conducting vias are provided, the distance between the conducting vias or their relative positions may also be adjusted to adjust the frequency band in which transmission is to be suppressed. In such a case, however, the region between the signal and ground vias needs to be greatly expanded, which will increase the required area of the multilayer board.

In fact, all the embodiments disclosed in Patent Document 1 are for adjustment to a 10 GHz to 20 GHz frequency band and do not show any adjustment to a high frequency above 20 GHz.

An object of the present invention, which has been made to solve the above problems, is to provide a high-frequency transmission line in which transmission of unwanted frequency signal components can be suppressed and which allows easy adjustment of the frequency band to be suppressed, and to provide a radar device and a wireless device each including such a high-frequency transmission line.

Means for Solving the Problems

To achieve the object, a high-frequency transmission line according to the present invention configured to stack a plurality of conductor layers and an insulating layer, the high-frequency transmission line including: a signal via that extends in a direction where the conductor and insulating layers are stacked and electrically connects the conductor layers to one another; an input line that is provided in one of the conductor layers to input an electric signal to the signal via; a signal line provided in another one of the conductor layers and connected to the input line through the signal via; a ground plane provided in one of the conductor layers, spaced apart from the signal via, and connected to a reference potential; a conductor arm provided in a spacing region between the signal via and the ground plane; and a conductor connecter that is provided in the spacing region to connect the conductor arm and the ground plane, wherein the conductor arm and the conductor connector are configured to suppress a specific frequency component of the electric signal.

A wireless device according to the present invention including the high-frequency transmission line.

A radar device according to the present invention including the high-frequency transmission line.

Effects of the Invention

The present invention makes it possible to provide a high-frequency transmission line in which transmission of unwanted frequency signal components can be suppressed and which allows easy adjustment of the frequency band to be suppressed, and to provide a radar device and a wireless device each including such a high-frequency transmission line.

PREFERRED MODE FOR CARRYING OUT THE INVENTION

Figure 1:
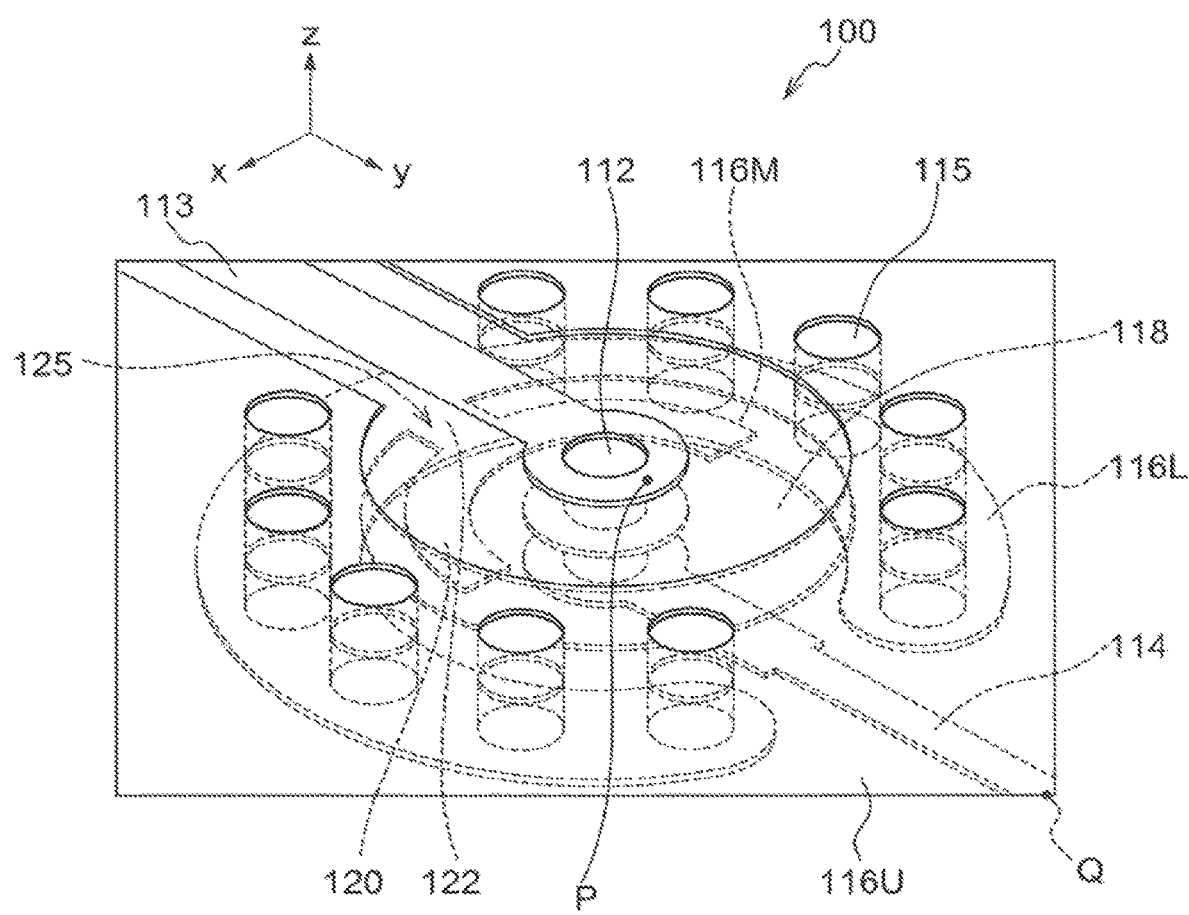
FIG. 1 is a perspective view of an area at and around a signal via in a high-frequency transmission line according to a first embodiment of the present invention.

Hereinafter, high-frequency transmission lines according to preferred embodiments of the present invention will be described in detail with reference to the drawings. In the drawings, components having the same function are designated by the same reference sign for the sake of simplicity of drawings and descriptions.

First Embodiment

Figure 2:
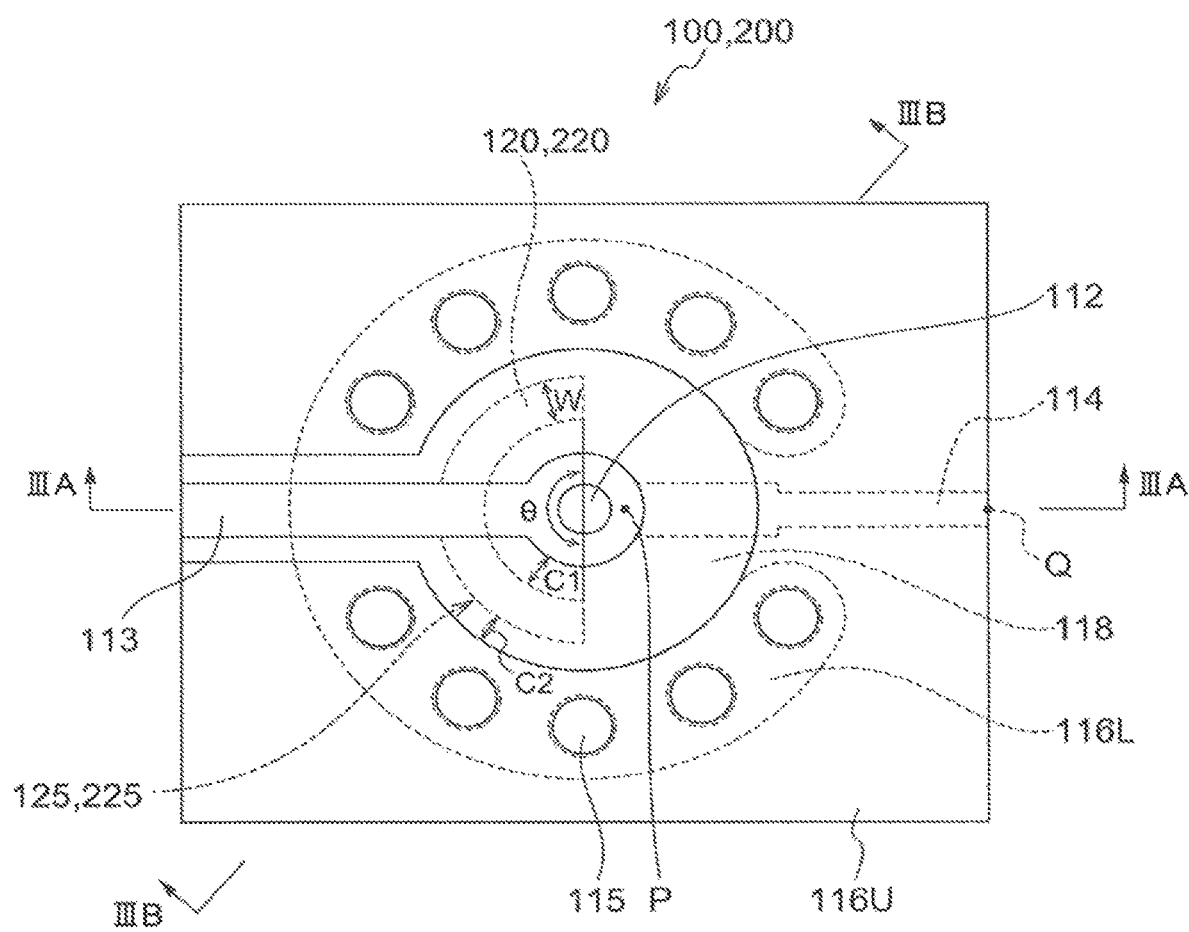
FIG. 2 is a top view of FIG. 1.
Figure 3A:
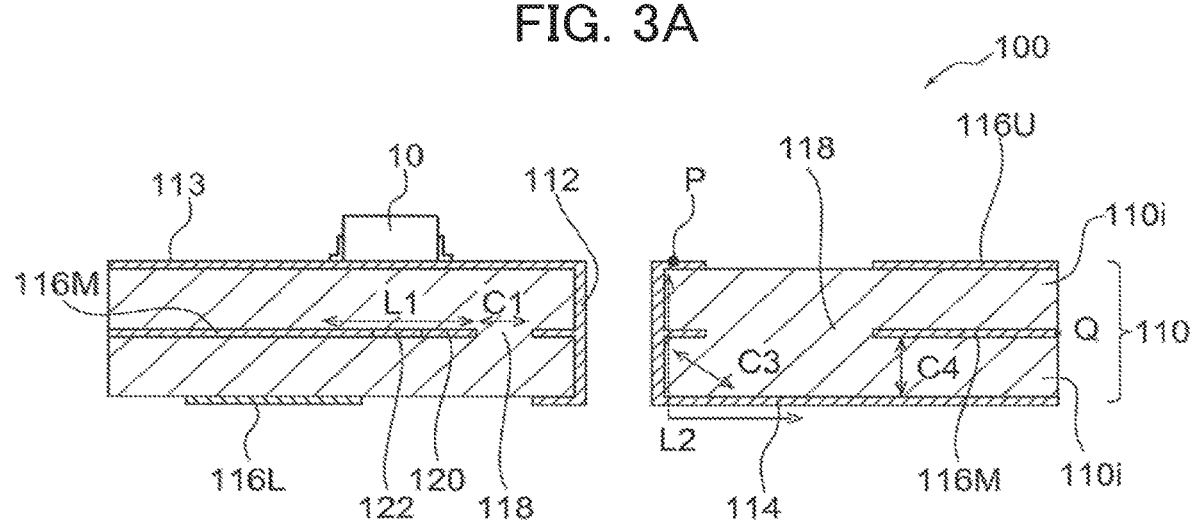
FIG. 3A is a cross-sectional view along the line IIIA-IIIA in FIG. 2, which shows connection to a high-frequency IC.

A high-frequency transmission line 100 according to a first embodiment of the present invention will be described with reference to FIGS. 1, 2, 3A, and 3B. FIG. 1 is a perspective view showing, in an enlarged scale, an area at and around a signal via 112 (described later) in the high-frequency transmission line 100. FIG. 2 is a top view of FIG. 1. FIG. 3A is a cross-sectional view along the line IIIA-IIIA in FIG. 2, which shows connection to a high-frequency IC, and FIG. 3B is a cross-sectional view along the line IIIB-IIIB in FIG. 2.

The high-frequency transmission line 100 of this embodiment includes: a multilayer board 110 in which conductor layers (layers having at least one of a signal line 114 and a ground plane 116 described later) and insulating layers 110$i$ are alternately stacked; a signal via 112 that extends in the stack direction of the multilayer board 110 (specifically, in a direction where the conductor and insulating layers are stacked) and electrically connects the conductor layers to one another; an input line 113 that is provided on the multilayer board to input an electric signal to the signal via 112; a signal line 114 provided in the conductor layer and connected to the signal via 112; and a ground plane 116 provided in the conductor layer and connected to a reference potential (GND). The input line 113, the signal line 114, and the ground plane 116 may be provided and spaced apart in the same layer.

Figure 3B:
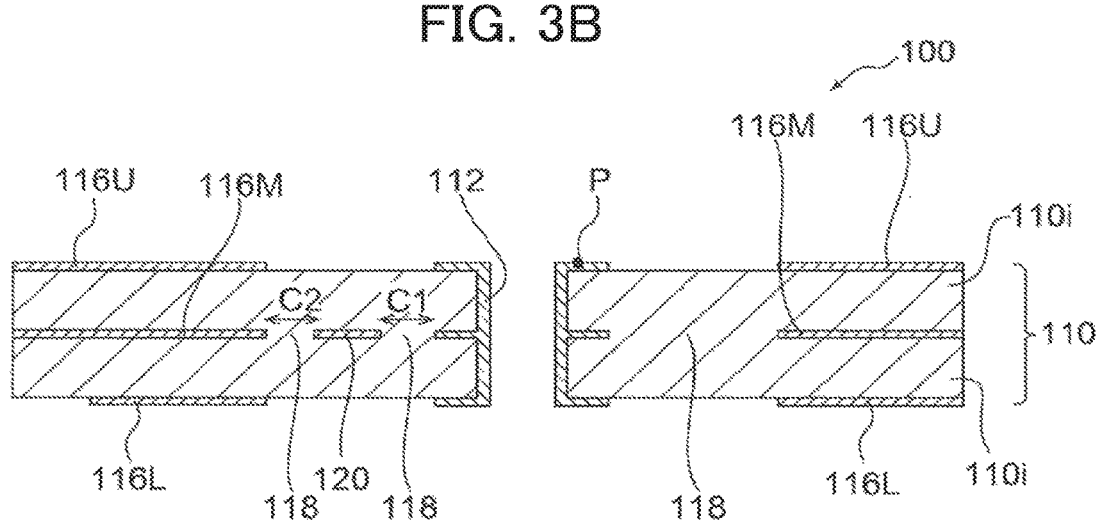
FIG. 3B is a cross-sectional view along the line IIIB-IIIB in FIG. 2.

In this embodiment, as shown in FIGS. 1, 3A, and 3B, the multilayer board 110 is composed mainly of three conductor layers and two insulating layers 110$i$ each between the conductor layers. Ground planes 116 are provided in an uppermost conductor layer (the upper surface of the board), an intermediate conductor layer, and a lowermost conductor layer (the lower surface of the board), which will be hereinafter referred to as ground planes 116U, 116M, and 116L, respectively. How many layers to be provided in the multilayer board and how to combine and dispose the input line 113, the signal line 114, and the ground plane 116 in each layer are non-limiting and may be determined as appropriate.

Each ground plane 116 is spaced apart from the signal via 112 so as not to be in contact with the signal via 112, and the resulting spacing region is what is called an anti-pad region 118. As shown in the top view of FIG. 2, the anti-pad region 118 is substantially circular (in other words, substantially annular) centered on the signal via 112 so that it surrounds the circumference of the signal via 112. It should be noted that the anti-pad region 118 may be any region for separation between the signal via 112 and the ground plane 116 and may have any shape.

Plural ground vias 115 passing in the stack direction through the multilayer board 110 are provided at intervals to surround the circumference of the anti-pad region 118 and connected to the ground plane 116L. As shown in FIGS. 1 and 2, the ground vias 115 are scattered at ten places in this embodiment. It will be understood that the number of ground vias 115 may be selected as desired or no ground via may be provided.

In the structure described above, the input line 113 of the high-frequency transmission line 100 may be connected to a high-frequency IC 10 as shown in FIG. 3A, so that a signal output from the high-frequency IC 10 is input to the signal via 112 through the input line 113 and transmitted downward through the signal via 112 to reach the signal line 114 in a lowermost layer. Subsequently, for example, the signal reaches an antenna (not shown) connected poststage and transmitted to outside from the antenna. Alternatively, the signal from the high-frequency IC 10 may be directly input to the signal via 112 through a coaxial cable or the like.

In addition to the features described above, the high-frequency transmission line 100 of this embodiment has an island conductor arm 120 in the anti-pad region (spacing region) 118; and a conductor connector 122 that connects a part of the conductor arm 120 and the ground plane 116M. A portion including the conductor arm 120 and the conductor connector 122 is referred to as a pad region 125. The conductor arm 120 itself is spaced apart from both the signal via 112 and the ground plane 116M and are provided in an island manner around the signal via 112 from the conductor connector 122. As shown in FIG. 3B, therefore, at the level of the conductor layer in which the conductor arm 120 and the conductor connector 122 are provided, an area is provided in which an outer edge of the signal via 112, a part of the anti-pad region (spacing region) 118, the conductor arm 120, and another part of the anti-pad region (spacing region) 118 are arranged in this order in a direction from the center of the signal via 112 to the outer edge of the anti-pad region (spacing region) 118.

As shown in FIGS. 1 and 2, the conductor arm 120 has a semicircular arc shape in top view, and the conductor connector 122 is linearly shaped (in other words, strip-shaped) to connect a center (portion) of the outer edge of the conductor arm 120 to the ground plane 116M. Usually, the conductor arm 120 and the conductor connector 122 are integrally formed together with the ground plane 116M, although any method may be used to connect these parts.

As shown in FIGS. 3A and 3B, the conductor arm 120 and the conductor connector 122 are disposed at a position where the ground plane 116M is located between a layer including the input line 113 and another layer including the signal line 114, although such a position is non-limiting. Alternatively, they may be disposed at a position where the ground plane 116U or 116L is located, which is at the same layer level as that of the input line 113 or the signal line 114, or disposed at different positions where any two or more ground planes 116 are located. In a preferred mode, the ground plane 116 is provided in the conductor layer that is different from the conductor layer in which the input line 113 is provided and that is closest to the conductor layer in which the input line 113 is provided. This feature makes it possible to suppress unwanted waves such as secondary harmonics at a prestage of the signal via 112 so that the effects of unwanted waves such as secondary harmonics on other conductor layers and insulating layers can be reduced.

As shown in FIGS. 2, 3A, and 3B, a capacitive coupling C1 occurs between the conductor arm 120 and the signal via 112. Since high-frequency signals are transmitted, a capacitive coupling C2 also occurs between the conductor arm 120 and the ground plane 116M at a reference potential.

When signals are transmitted, the high-frequency transmission line 100 according to the present invention undergoes resonance, which is caused by the capacitive couplings C1 and C2 and an inductor component L1 of the conductor connector 122 (and a part of the conductor arm 120). Even if high-frequency electric signals are input from the input line 113, the resonance can cause an increase in transmission loss in a specific frequency band so that unwanted frequency components of electric signals can be suppressed during transmission.

Figure 4:
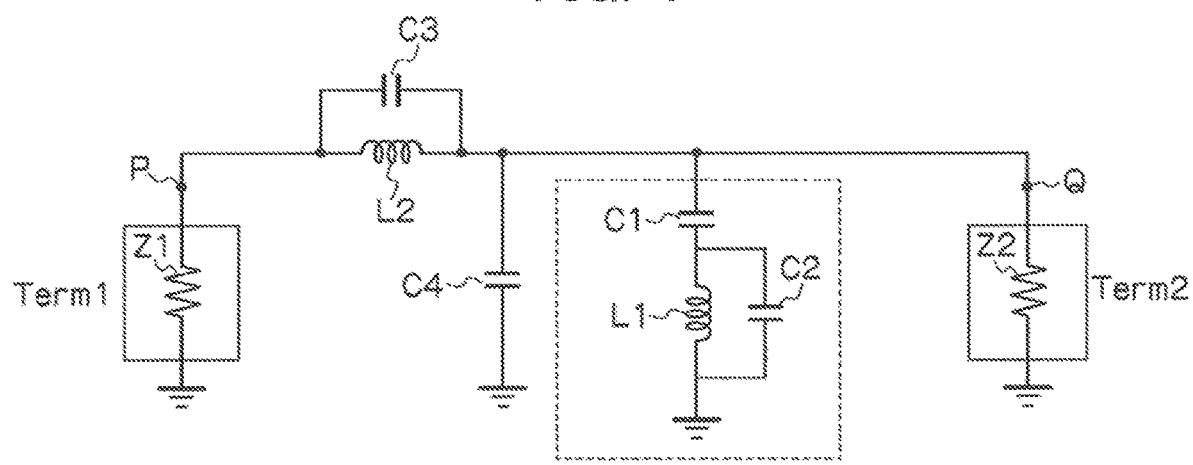
FIG. 4 is a diagram of an equivalent circuit of a part at and around the signal via in the high-frequency transmission line according to the first embodiment.

Hereinafter, the resonance phenomenon will be described with reference to an equivalent circuit shown in FIG. 4. FIG. 4 is a schematic diagram of an equivalent circuit, in which a signal from a signal input part Term 1 (such as the high-frequency IC 10) is transmitted through a signal input port P on the upper surface of the signal via 112 in the high-frequency transmission line 100 shown in FIGS. 1, 2, 3A, and 3B, then transmitted downward through the signal via 112 to the signal line 114, and output to an external signal output part Term 2 (such as an antenna) connected to a signal output port Q of the signal line 114. L2 represents an inductor component of the signal via 112 and the signal line 114, C3 a capacitive coupling at a bent portion between the signal via 112 and the signal line 114, and C4 a capacitive coupling that occurs between the signal line 114 and the ground plane 116M.

FIG. 4 also shows, in the dotted line box, the capacitive coupling C1 between the conductor arm 120 and the signal via 112, the capacitive coupling C2 between the conductor arm 120 and the ground plane 116M, and the inductor component L1 of the conductor connector 122 and the conductor arm 120, which are mentioned above. An LC resonant circuit formed is shown in the dotted line box. The LC resonant circuit shown in the dotted line box, which produces resonance, is formed according to the arrangement in the pad region 125 (the arrangement of the conductor arm and the conductor connector).

Second Embodiment

Next, a high-frequency transmission line 200 according to a second embodiment of the present invention will be described with reference to FIG. 2. In the first embodiment, the conductor arm 120 provided in an island manner in the anti-pad region (spaced region) 118 has a semicircular arc shape in top view. In the second embodiment, however, a conductor arm 220 is provided in an arc shape with its central angle θ adjustable to any appropriate degree (in the first embodiment, θ is 180°).

Figure 5:
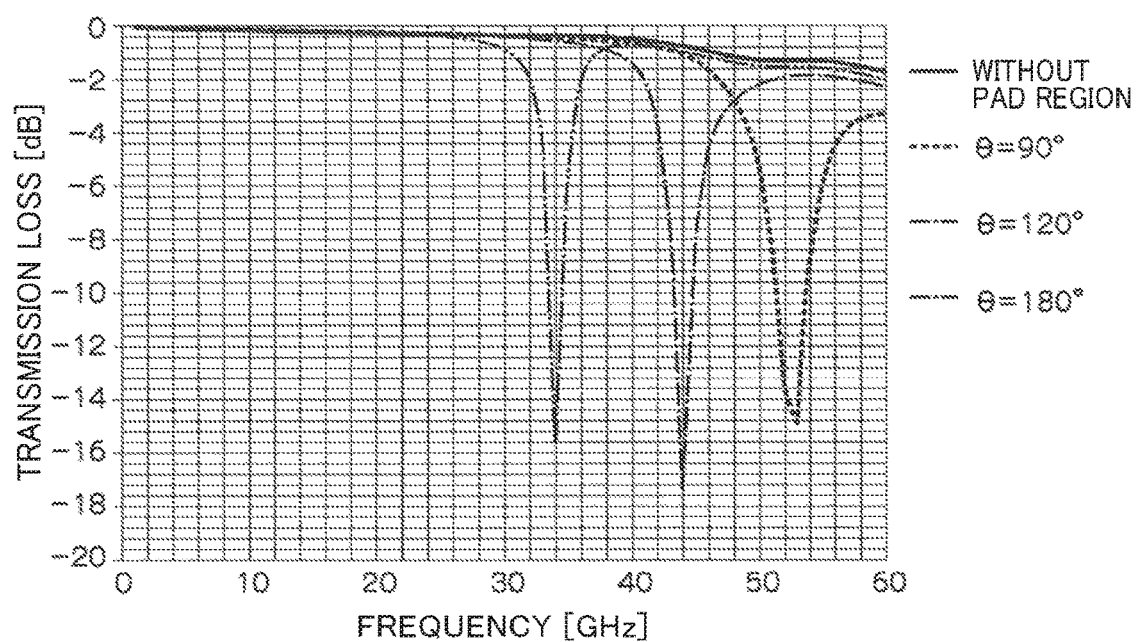
FIG. 5 is a graph showing the frequency characteristics of transmission loss in high-frequency transmission lines according to first and second embodiments.

FIG. 5 is a graph showing the frequency characteristics of transmission loss in the high-frequency transmission lines according to the first embodiment (θ=180°) and the second embodiment (θ=90°, 120°) (the results of electromagnetic field simulation). For comparison, the graph also shows the result obtained in the case where the pad regions 125 and 225 are eliminated from these embodiments.

FIG. 5 shows that the resonance frequency at which the transmission loss S is maximal decreases as the central angle θ of the conductor arm increases. Depending on the degree of the central angle θ, the resonance frequency band changes over a wide range of more than about 30 GHz to 55 GHz. This indicates that the frequency band in which transmission is to be suppressed in the high-frequency transmission line 200 (hereinafter referred to as the transmission suppression frequency band) can be easily adjusted by changing the central angle θ of the conductor arm 220.

Such changes can occur as follows. As the central angle θ of the conductor arm 220 increases, the capacitive coupling C1 between the conductor arm 220 and the signal via 112 and the capacitive coupling C2 between the conductor arm 220 and the ground plane 116M increase to change the resonance frequency of the LC resonant circuit in the dotted line box of FIG. 4 and to change its frequency band. Therefore, not only changes in the central angle θ (changes in the length of the arc) but also changes in the width W of the arc of the conductor arm 220 can lead to changes in the capacitive couplings C1 and C2 and the inductor component L1 for adjustment of the transmission suppression frequency band.

Alternatively, the conductor arm may have any shape other than the arc shape to change the capacitive coupling C1 between the conductor arm and the signal via and the capacitive coupling C2 between the conductor arm and the ground plane for adjustment of the transmission suppression frequency band.

Next, embodiments with such different conductor arm shapes will be specifically described with reference to third to fifth embodiments.

Figure 6:
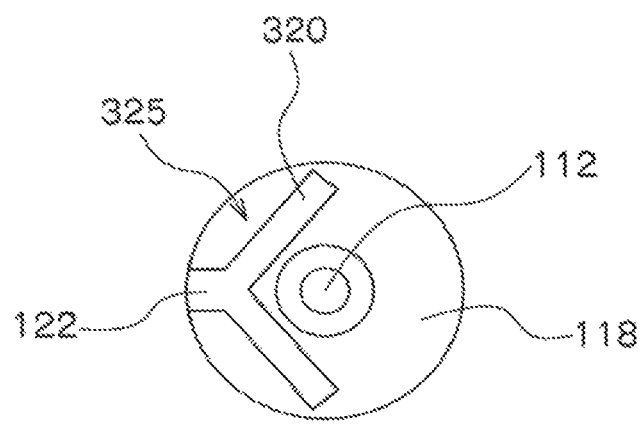
FIG. 6 is a top view of an anti-pad region of a high-frequency transmission line according to a third embodiment of the present invention, in which a pad region is provided.

Third Embodiment A high-frequency transmission line according to a third embodiment of the present invention will be described with reference to FIG. 6. FIG. 6 is a top view of an anti-pad region (spacing region) 118 of the high-frequency transmission line of this embodiment, in which a pad region (a conductor arm and a conductor connector) 325 is provided. The high-frequency transmission line of this embodiment differs from those of other embodiments in that a V-shaped conductor arm 320 is provided in an island manner in the anti-pad region (spacing region) 118.

Figure 7:
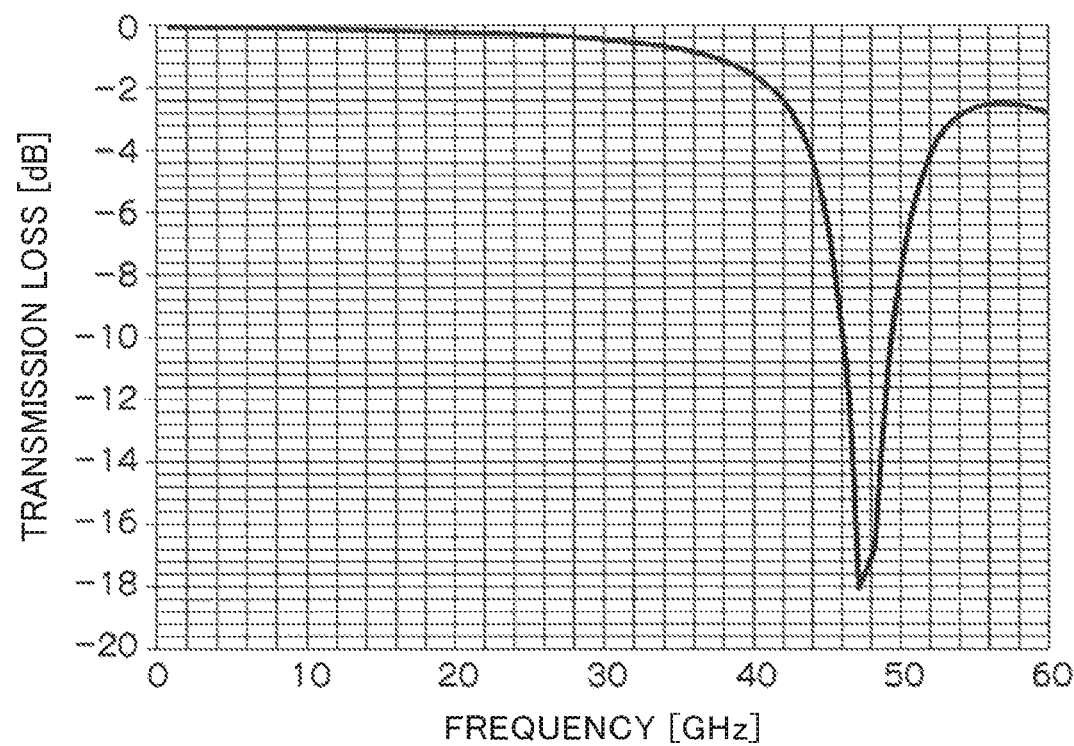
FIG. 7 is a graph showing the frequency characteristics of transmission loss in the high-frequency transmission line according to the third embodiment.

FIG. 7 is a graph showing the frequency characteristics of transmission loss in the high-frequency transmission line of this embodiment (the result of electromagnetic field simulation). The graph indicates that the transmission suppression frequency band shifts to more than about 47 GHz.

Fourth Embodiment

Figure 8:
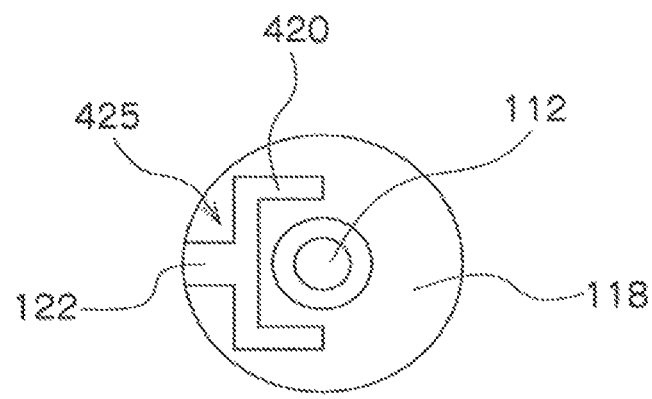
FIG. 8 is a top view of an anti-pad region of a high-frequency transmission line according to a fourth embodiment of the present invention, in which a pad region is provided.

A high-frequency transmission line according to a fourth embodiment of the present invention will be described with reference to FIG. 8. FIG. 8 is a top view of an anti-pad region (spacing region) 118 of the high-frequency transmission line of this embodiment, in which a pad region (a conductor arm and a conductor connector) 425 is provided. The high-frequency transmission line of this embodiment differs from those of other embodiments in that an angular U-shaped conductor arm 420 is provided in an island manner in the anti-pad region (spacing region) 118.

Figure 9:
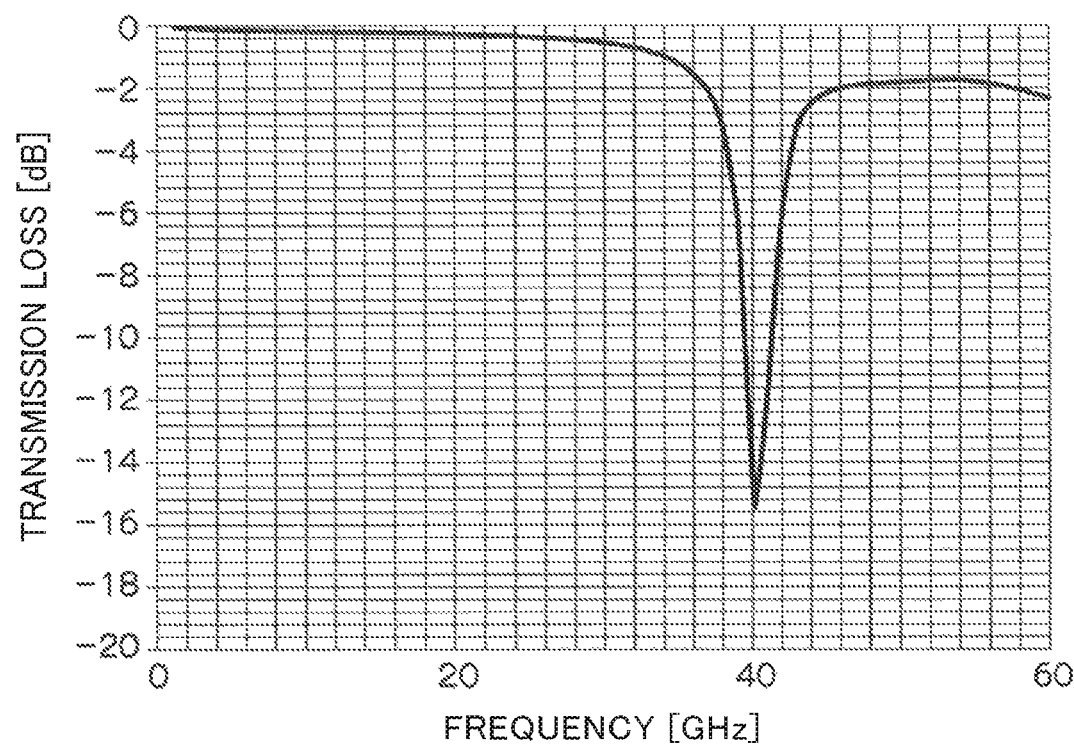
FIG. 9 is a graph showing the frequency characteristics of transmission loss in the high-frequency transmission line according to the fourth embodiment.

FIG. 9 is a graph showing the frequency characteristics of transmission loss in the high-frequency transmission line of this embodiment (the result of electromagnetic field simulation). The graph indicates that the transmission suppression frequency band shifts to about 40 GHz.

Fifth Embodiment

Figure 10:
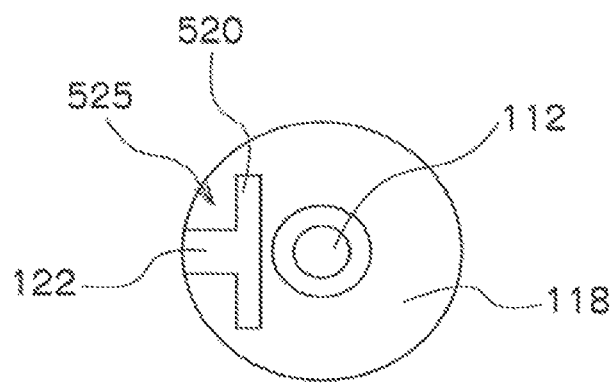
FIG. 10 is a top view of an anti-pad region of a high-frequency transmission line according to a fifth embodiment of the present invention, in which a pad region is provided.

A high-frequency transmission line according to a fifth embodiment of the present invention will be described with reference to FIG. 10. FIG. 10 is a top view of an anti-pad region (spacing region) 118 of the high-frequency transmission line of this embodiment, in which a pad region (a conductor arm and a conductor connector) 525 is provided. The high-frequency transmission line of this embodiment differs from those of other embodiments in that a linear (in other words, strip-shaped) conductor arm 520 is provided in an island manner in the anti-pad region (spacing region) 118.

Figure 11:
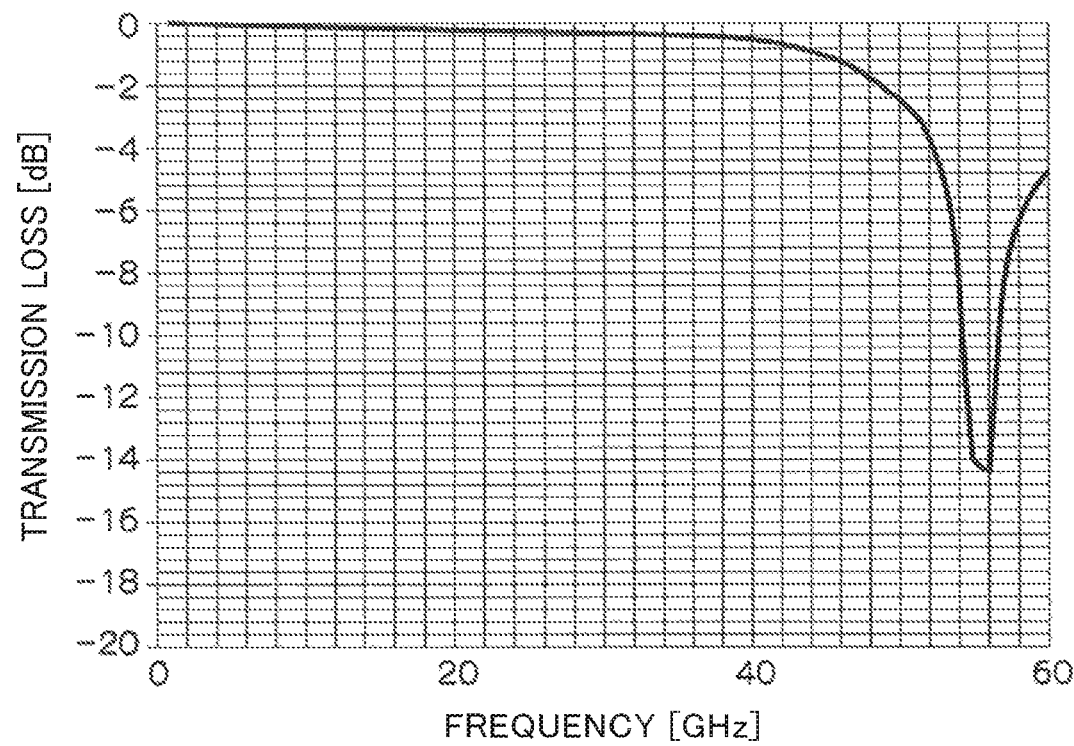
FIG. 11 is a graph showing the frequency characteristics of transmission loss in the high-frequency transmission line according to the fifth embodiment.

FIG. 11 is a graph showing the frequency characteristics of transmission loss in the high-frequency transmission line of this embodiment (the result of electromagnetic field simulation). The graph indicates that the transmission suppression frequency band shifts to about 56 GHz.

Sixth Embodiment

Figure 12:
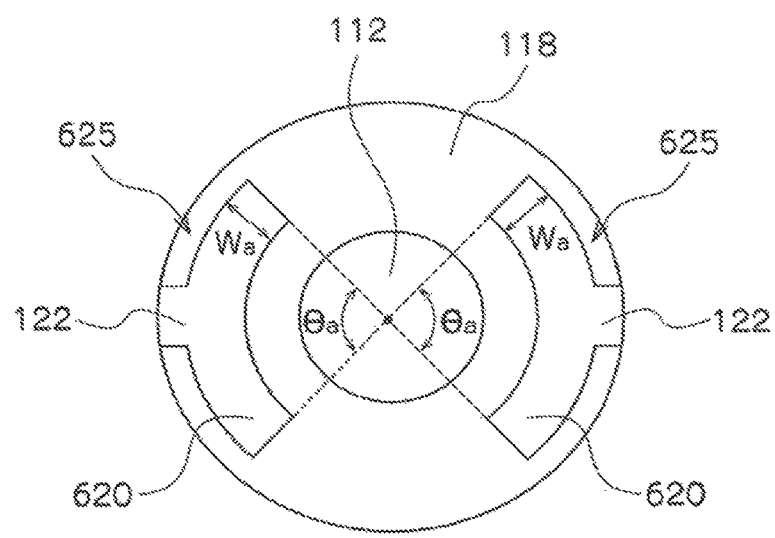
FIG. 12 is a top view of an anti-pad region of a high-frequency transmission line according to a sixth embodiment of the present invention, in which pad regions are provided.

A high-frequency transmission line according to a sixth embodiment of the present invention will be described with reference to FIG. 12. FIG. 12 is a top view of an anti-pad region (spacing region) 118 of the high-frequency transmission line of this embodiment, in which pad regions (conductor arms and conductor connectors) 625 are provided. The high-frequency transmission line of this embodiment has two pad regions (conductor arms and conductor connectors) 625 of the same shape in the anti-pad region (spacing region) 118. The pad regions (conductor arms and conductor connectors) 625 are arranged point-symmetrically centered on a signal via 112. Each pad region 625 has a conductor arm 620 in an arc shape with a width Wa and a central angle θa, although such a shape is non-limiting. Alternatively, the pad regions (conductor arms and conductor connectors) 625 may not be point-symmetric centered on the signal via 112.

Figure 13:
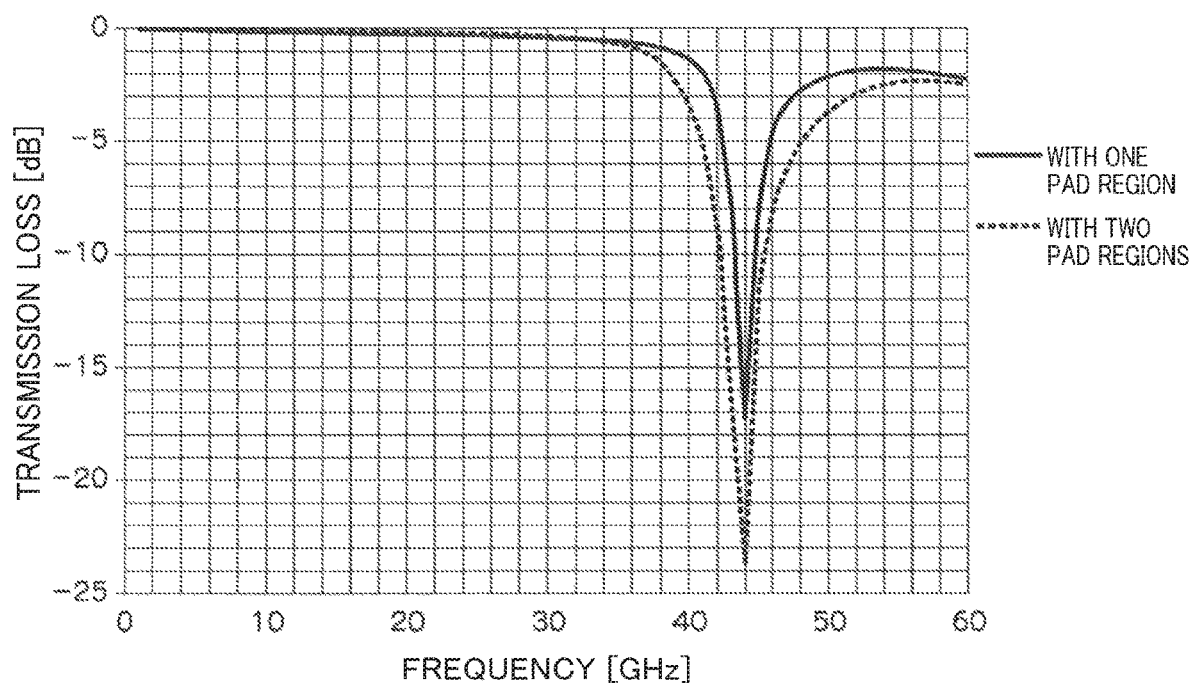
FIG. 13 is a graph showing the frequency characteristics of transmission loss in the high-frequency transmission line according to the sixth embodiment.

FIG. 13 is a graph showing the frequency characteristics of transmission loss in the high-frequency transmission line of this embodiment (the result of electromagnetic field simulation). It compares the result of the case where the two pad regions (conductor arms and conductor connectors) 625 are provided with the result of a comparative case where a single pad region (a conductor arm and a conductor connector) 625 is provided. It indicates that the transmission loss increases as the number of the pad regions (conductor arms and conductor connectors) 625 increases from one to two. On the other hand, it indicates that the transmission suppression frequency band does not shift from around 44 GHz.

This means that, as compared to a single pad region, two pad regions (conductor arms and conductor connectors) of the same shape can provide an increased transmission loss with the transmission suppression frequency band remaining unchanged. The transmission loss can be increased in a transmission suppression frequency band remaining unchanged.

Seventh Embodiment

Figure 14:
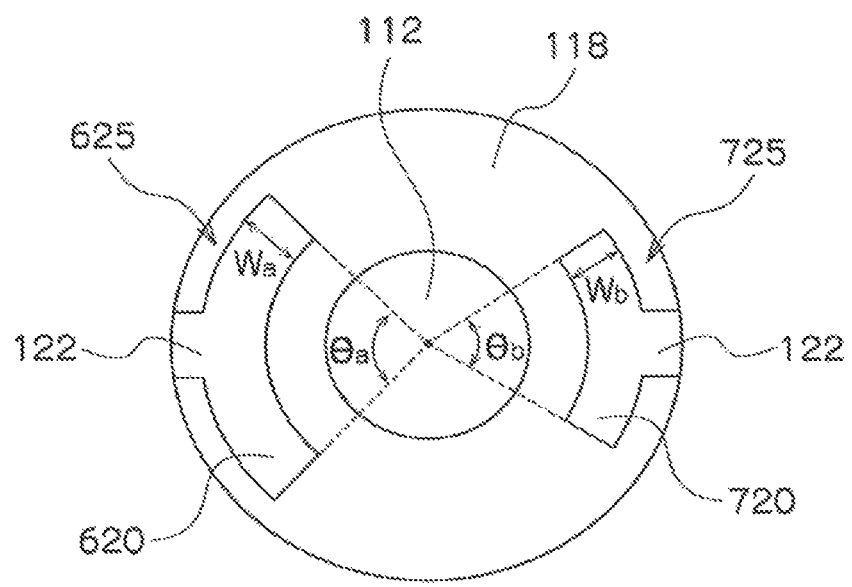
FIG. 14 is a top view of an anti-pad region of a high-frequency transmission line according to a seventh embodiment of the present invention, in which pad regions are provided.

A high-frequency transmission line according to a seventh embodiment of the present invention will be described with reference to FIG. 14. FIG. 14 is a top view of an anti-pad region (spacing region) 118 of the high-frequency transmission line of this embodiment, in which pad regions (conductor arms and conductor connectors) 625 and 725 are provided. The high-frequency transmission line of this embodiment is a modification of that of the sixth embodiment, in which a conductor arm 720 with a different shape is substituted for one conductor arm 620 in two pad regions 625 according to the sixth embodiment. In other words, the high-frequency transmission line of this embodiment has two pad regions (conductor arms and conductor connectors) 625 and 725 of different shapes. The two pad regions (conductor arms and conductor connectors) 625 and 725 are arranged opposite to each other centered on a signal via 112, although such an opposed arrangement is not essential.

The pad region (conductor arm and conductor connector) 625 has an arc shape with a width Wa and a central angle θa, while the pad region (conductor arm and conductor connector) 725 has an arc shape with a width Wb and a central angle θb. As long as they have different shapes, they may be any combination of arc shapes.

Figure 15:
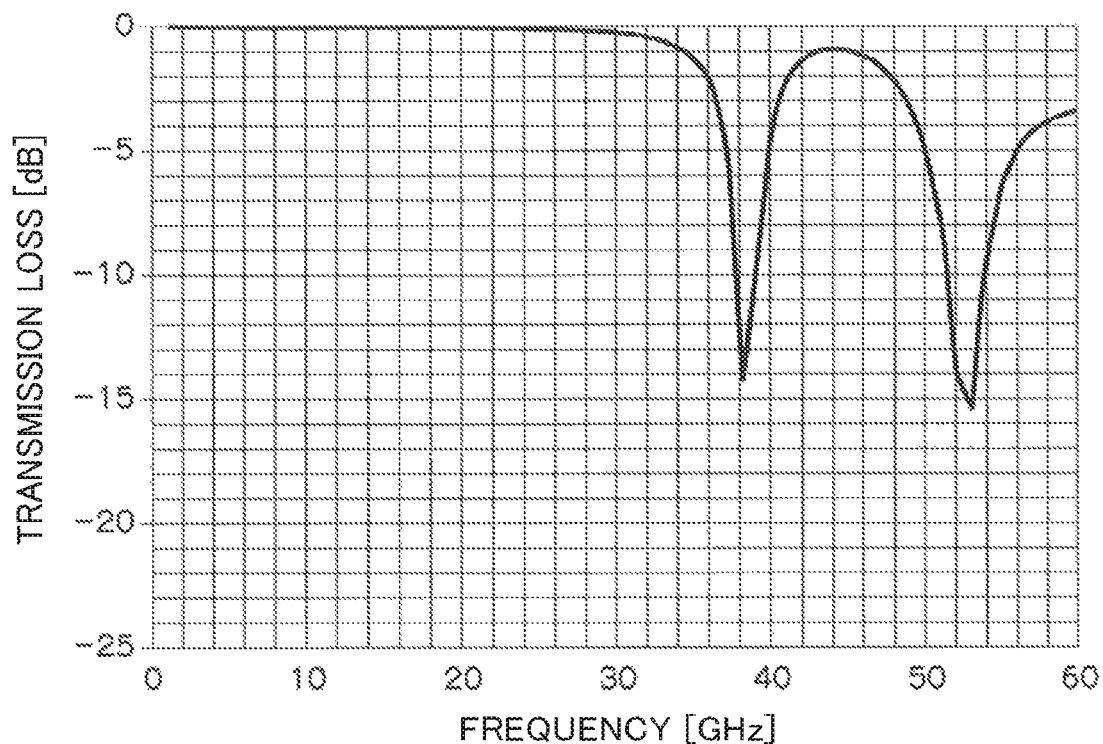
FIG. 15 is a graph showing the frequency characteristics of transmission loss in the high-frequency transmission line according to the seventh embodiment.

FIG. 15 is a graph showing the frequency characteristics of transmission loss in the high-frequency transmission line of this embodiment (the result of simulation). The graph shows that transmission suppression frequency bands occur at around 38 GHz and around 53 GHz. This means that, if a pad region (a conductor arm and a conductor connector) of a different shape is added so that two different pad regions are provided, the number of transmission suppression frequency bands can be increased from one to two.

The above embodiments are used to show how the transmission suppression frequency band changes in association with changes in the conductor arm shape (the second to fifth embodiments) and changes in the number of pad regions (conductor arms and conductor connectors) (the sixth and seventh embodiments). FIG. 5 typically indicates that the transmission suppression frequency band can be changed over a wide frequency range by simple adjustment such as a change in the conductor arm shape. In addition, FIGS. 13 and 15 indicate that the transmission loss or the transmission suppression frequency band can be increased by simple adjustment such as an increase in the number of pad regions (conductor arms and conductor connectors).

Therefore, the present invention makes it possible to provide a high-frequency transmission line in which unwanted waves such as higher harmonics can be suppressed even in high frequency bands for wireless communication, on-vehicle radars, and so on. The present invention also makes it possible to provide a high-frequency transmission line for use in a wireless device or radar device having a multiplier, in which unwanted frequency components, such as the frequency of electric signals from a local oscillation source before multiplication, can be suppressed during transmission of signals (described in detail later). The present invention is also advantageous in that the transmission suppression frequency band and the number of transmission suppression frequency bands can be changed by changing the shape and/or number of pad regions (conductor arms and conductor connectors) or changing their combination, which means a high degree of freedom in design.

Hereinafter, an example of a radar device including the high-frequency transmission line according to an embodiment will be described. It will be understood that the high-frequency transmission line according to an embodiment may be used in not only radar device but also various wireless device for wireless communication. A conventional radar device will be first described, and then a radar device according to an embodiment will be described.

Figure 16:
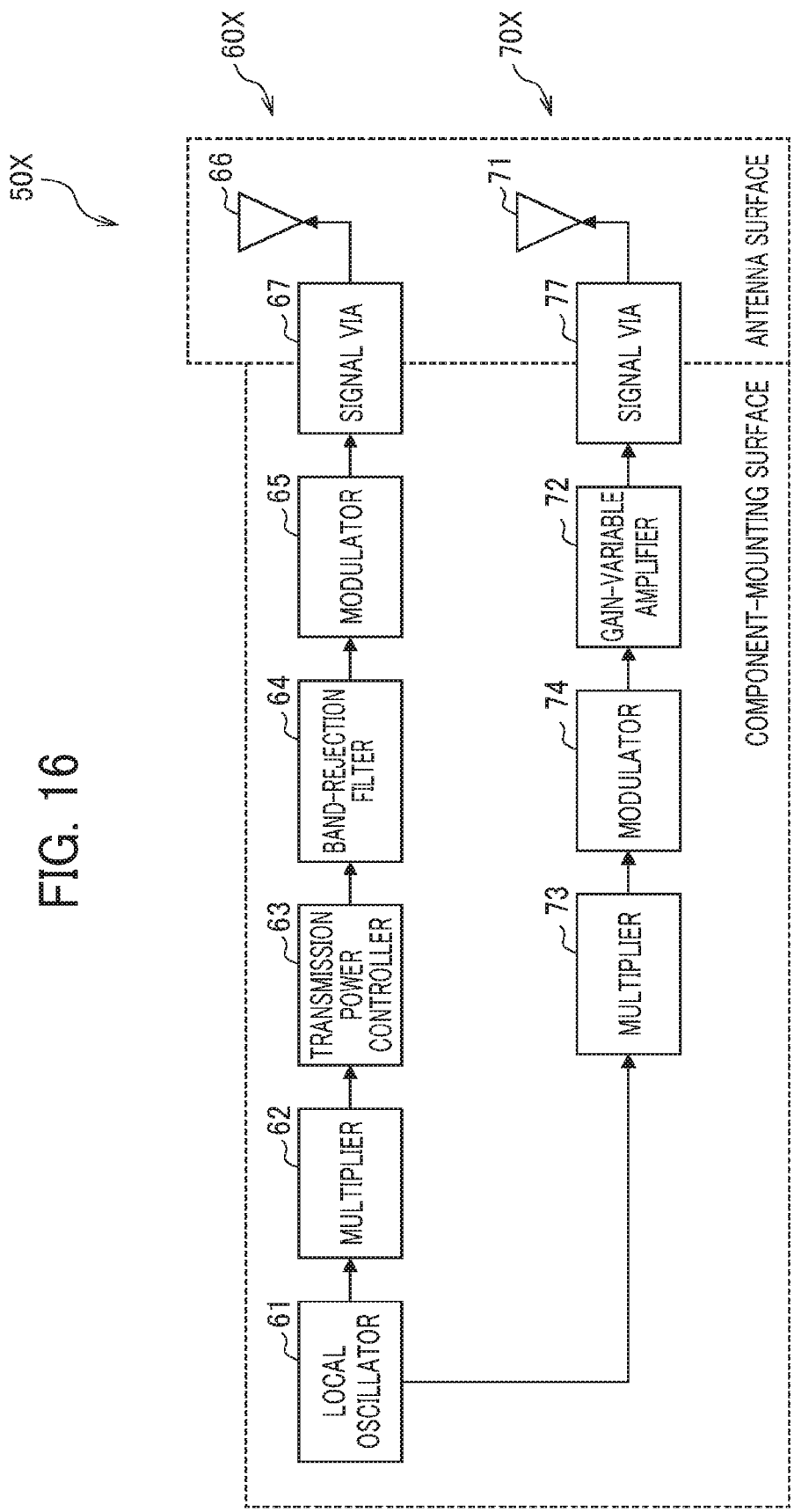
FIG. 16 is a circuit block diagram showing an example of a conventional radar device.

FIG. 16 is a circuit block diagram showing an example of a conventional radar device. A radar device 50X shown in FIG. 16 is a device for use in various on-vehicle radars such as on-vehicle 76 GHz or 79 GHz band millimeter-wave radars or on-vehicle 24 GHz band radars. The radar device 50X includes a transmitter 60X and a receiver 70X.

The transmitter 60X includes a local oscillator 61, a multiplier 62, a transmission power controller 63, a band-rejection filter 64, and a modulator 65, which are mounted on a component-mounting surface of a board. The transmitter 60X further includes a transmitting antenna 66 provided on an antenna surface of the board opposite to the component-mounting surface. The transmitter 60X further includes a signal via 67 that connects the component-mounting surface and antenna surface of the board. The local oscillator 61 generates a CW (continuous wave) signal of a predetermined frequency. The multiplier 62 multiplies the CW signal of the predetermined frequency input from the local oscillator 61 and outputs the multiplied CW signal to the poststage. For example, in a case where the radar device is an on-vehicle 79 GHz band millimeter-wave radar device, the local oscillator 61 may generate a 26 GHz CW signal, and the multiplier 62 may triple the CW signal. Alternatively, for example, in a case where the radar device is an on-vehicle 24 GHz band millimeter-wave radar device, the local oscillator 61 may generate a 6 GHz CW signal, and the multiplier 62 may quadruple the CW signal. Alternatively, the transmitter 60X may not include the multiplier 62, and the local oscillator 61 may directly generate a 79 GHz or 24 GHz CW signal.

The transmission power controller 63 controls the transmitted power by amplifying the CW signal generated by the local oscillator 61 and the multiplier 62. The band-rejection filter 64 is provided to suppress unwanted waves such as certain frequency components of the CW signal generated by the local oscillator 61, which are contained in the CW signal multiplied by the multiplier 62. The band-rejection filter 64 includes, for example, a patterned copper film formed on the component-mounting surface of the board.

The modulator 65 pulse-modulates the CW signal from the transmission power controller 63, which has passed through the band-rejection filter 64, to generate a transmission signal to be transmitted. This embodiment shows a pulse modulation system as a non-limiting example. For example, an FMCW modulation system may be provided, in which the transmitter 60X does not include the modulator 65 and is configured to directly modulate the voltage control signal from the local oscillator.

The signal via 67 transmits the transmission signal generated by the modulator 65 to the transmitting antenna 66. In other words, the signal via 67 transmits the transmission signal from the component-mounting surface to antenna surface of the board. The transmitting antenna 66 transmits the transmission signal to the outside. Specifically, the transmitting antenna 66 poststage of the multiplier 62 transmits the multiplied CW signal as the transmission signal to the outside.

On the other hand, the receiver 70X includes a receiving antenna 71 provided on an antenna surface of a board. The receiver 70X further includes a variable-gain amplifier 72, a multiplier 73, and a demodulator 74, which are mounted on a component-mounting surface of the board. The receiver 70X further includes a signal via 77 that connects the component-mounting surface and antenna surface of the board.

The receiving antenna 71 receives a received signal from the outside. The signal via 77 transmits the received signal from the receiving antenna 71 to the variable-gain amplifier 72. In other words, the signal via 77 transmits the received signal from the antenna surface to component-mounting surface of the board.

The variable-gain amplifier 72 amplifies the received signal with a gain that is variable as desired. Like the multiplier 62 described above, the multiplier 73 multiplies the CW signal of the predetermined frequency input from the local oscillator 61, and output the multiplied CW signal to the poststage. In this regard, if the local oscillator 61 directly generates a 79 GHz or 24 GHz CW signal, the receiver 70X may not include the multiplier 73.

The demodulator 74 demodulates the received signal from the variable-gain amplifier 72 by using the CW signal generated through the local oscillator 61 and the multiplier 73.

In this conventional radar device 50X, on the component-mounting surface, there is need to mounting area for mounting the band-rejection filter 64 in the transmitter 60X. Therefore, when downsizing the radar device 50X, there is need to the mounting area in the conventional radar device 50X, which makes it difficult to achieve high-density mounting and downsizing of the radar device. In this regard, the use of the high-frequency transmission line 100 or 200 having a band-rejection function and a signal via according to the embodiment makes it possible to achieve high-density mounting and downsizing of the radar device.

Figure 17:
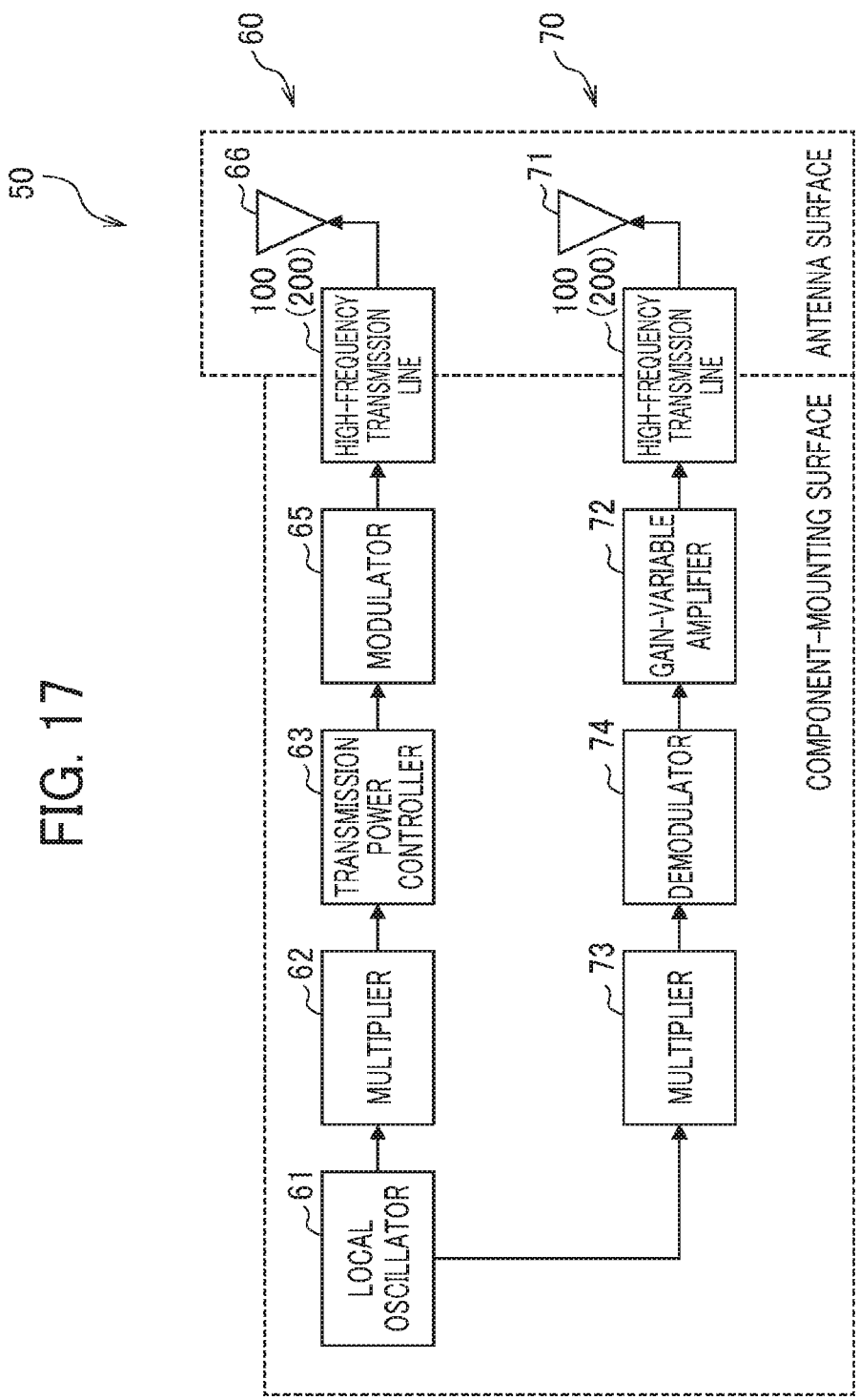
FIG. 17 is a circuit block diagram showing an example of a radar device including a high-frequency transmission line according to an embodiment.

FIG. 17 is a circuit block diagram showing an example of a radar device including the high-frequency transmission line according to an embodiment. The radar device 50 shown in FIG. 17 includes a transmitter 60 and a receiver 70 instead of the transmitter 60X and the receiver 70X of the conventional radar device 50X shown in FIG. 16.

The transmitter 60 includes the high-frequency transmission line 100 (or 200) having a band-rejection function and the signal via 112 according to the embodiment described above, instead of the band-rejection filter 64 and the signal via 67 of the conventional transmitter 60X shown in FIG. 16.

The receiver 70 may also include the high-frequency transmission line 100 (or 200) having a band-rejection function and the signal via 112 according to the embodiment described above, instead of the signal via 77 of the conventional receiver 70X shown in FIG. 16.

In the high-frequency transmission line 100 (or 200) according the embodiment, a band-rejection function is produced by the conductor arm and the conductor connector provided in the spacing region between the signal via and the ground plane, which are initially provided, so that there is no need for an area for mounting the conventional band-rejection filter 64. This makes it possible to achieve high-density mounting and downsizing of the radar device 50 of the embodiment.

In general, a lower transmission suppression frequency band requires a larger area for mounting a band-rejection filter. According to the embodiment, therefore, there is no need for a relatively large band-rejection filter in a 24 GHz band radar device, which works at relatively low frequencies, and the radar device can be produced in a smaller size through higher density mounting. If a multiplier is provided to multiply a CW signal generated by a local oscillator, the unmultiplied CW signals output from the local oscillator may be output to the poststage. According to the present invention, such unwanted CW signals can be reduced without any relatively large band-rejection filter provided on the mounting surface, as mentioned above, which brings about more advantageous effects for producing smaller radar device through higher density mounting. In addition, when a CW signal with a 20 GHz or more band is multiplied to output a signal with a relatively high frequency band such as a 76 GHz or 79 GHz band, the high-frequency transmission line 100 (or 200) may be configured to reduce the 20 GHz or more signal, and the use of the high-frequency transmission line 100 (or 200) brings about more advantageous effects.

In general, as the frequency increases, the area for mounting an antenna decreases, and the ratio of the area for mounting a band-rejection filter increases with respect to the area for mounting all components of a radar device. According to the embodiment, therefore, if a 76 GHz or 79 GHz band radar device, which works at relatively high frequencies, does not need any band-rejection filter having a high ratio of the area for mounting it to the area for mounting all components of the radar device, the radar device can be produced in a smaller size through higher density mounting. In particular, the size of the whole of the radar device 50X tends to depend on the size of an antenna element disposed on the antenna surface, and the size of the antenna element decreases as the frequency band becomes higher. When a relatively small antenna element is used, which is required for a 76 GHz or 79 GHz band, the high-frequency transmission line 100 (or 200) of the embodiment can be more advantageously used to produce smaller and higher-density radar devices for such bands.

In addition, the high-frequency transmission line 100 (or 200) of the embodiment may be used in the receiver 70 as well as in the transmitter 60, so that unwanted waves such as secondary harmonics can be reduced, which may be directly introduced from the transmitter 60 into the receiver 70. When the radar device is located close to an additional radar device with a different frequency band, unwanted waves such as signals transmitted from the additional radar device can also be reduced.

It will be understood that the embodiments described above show some examples of the high-frequency transmission line according to the present invention and are not intended to limit the present invention. The details of the features, operation, and other aspects of the high-frequency transmission lines according to the embodiments may be appropriately altered or modified without departing from the gist of the present invention.

For example, while the above embodiments show changes in transmission suppression frequency in association with changes in the conductor arm shape and the number of pad regions, such methods for adjusting the transmission suppression frequency band are non-limiting. Alternatively, the transmission suppression frequency band can be changed if at least one of the capacitive couplings C1 and C2 and the inductor component L1 can be changed in the LC resonant circuit shown in the line box in the equivalent circuit diagram of FIG. 4. Specifically, the length, width, or shape of the conductor connector 122 can be changed to change the inductor component L1, and the position of the conductor arm and/or the conductor connector in the anti-pad region 118 or the size or shape of the anti-pad region 118 can be changed to change the capacitive couplings C1 and C2.

EXAMPLES

High-frequency transmission lines according to the embodiments described above were fabricated as examples, and their transmission loss characteristics S21 were measured.

Example 1

A high-frequency transmission line according to the first embodiment described above was fabricated as Example 1. Details of the high-frequency transmission line of Example 1 are as follows:

Board: three conductor layers and two insulating layers;
Input line: provided in the uppermost conductor layer in the board;
Signal line: provided in the lowermost conductor layer in the board;
Signal via: penetrating from the uppermost conductor layer to the lowermost conductor layer in the board;
Ground plane: provided in the intermediate conductor layer in the board;
Spacing region: 0.4 mm in diameter of inner circumference (outer diameter of signal via), 1.3 mm in diameter of outer circumference;
Conductor arm: provided in the intermediate conductor layer in the board, arc shape with a central angle $\theta$ of 120° and a width of 0.2 mm;
Conductor connector: provided in the intermediate conductor layer in the board and connected to the center of the conductor arm.

Example 2

A high-frequency transmission line according to the seventh embodiment described above was fabricated as Example 2. The high-frequency transmission line of Example 2 differs from that of Example 1 in that it has two conductor arms different in shape and two conductor connectors.

One of the conductor arms: arc shape with a central angle θ of 120° and a width of 0.2 mm;
One of the conductor connectors: connected to the center of one of the conductor arms;
The other of the conductor arms: arc shape with a central angle θ of 180° and a width of 0.2 mm;
The other of the conductor connectors: connected to the center of the other of the conductor arms.

Example 3

A high-frequency transmission line according to the first embodiment described above was fabricated as Example 3. The high-frequency transmission line of Example 3 differs from that of Example 1 in that it has a different conductor arm structure.
Spacing region: 0.4 mm in diameter of inner circumference (outer diameter of signal via), 1.2 mm in diameter of outer circumference;
Conductor arm: arc shape with a central angle θ of 270° and a width of 0.2 mm.
(Measurement)

Figure 18:
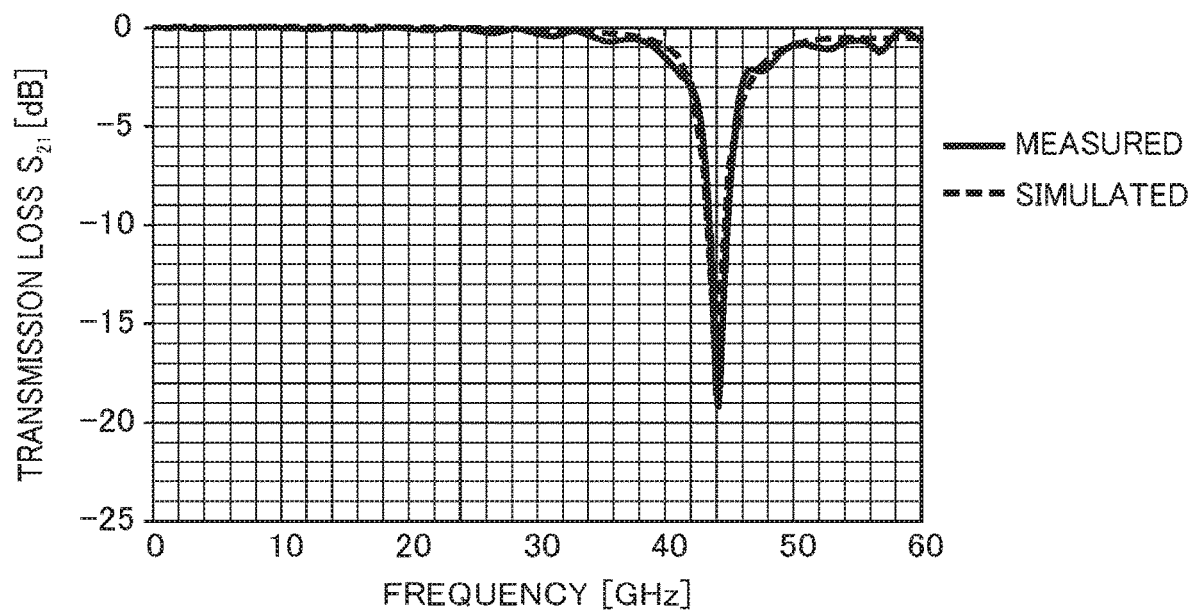
FIG. 18 is a graph showing a result of measurement of the transmission loss characteristic S21 of a high-frequency transmission line of Example 1.
Figure 19:
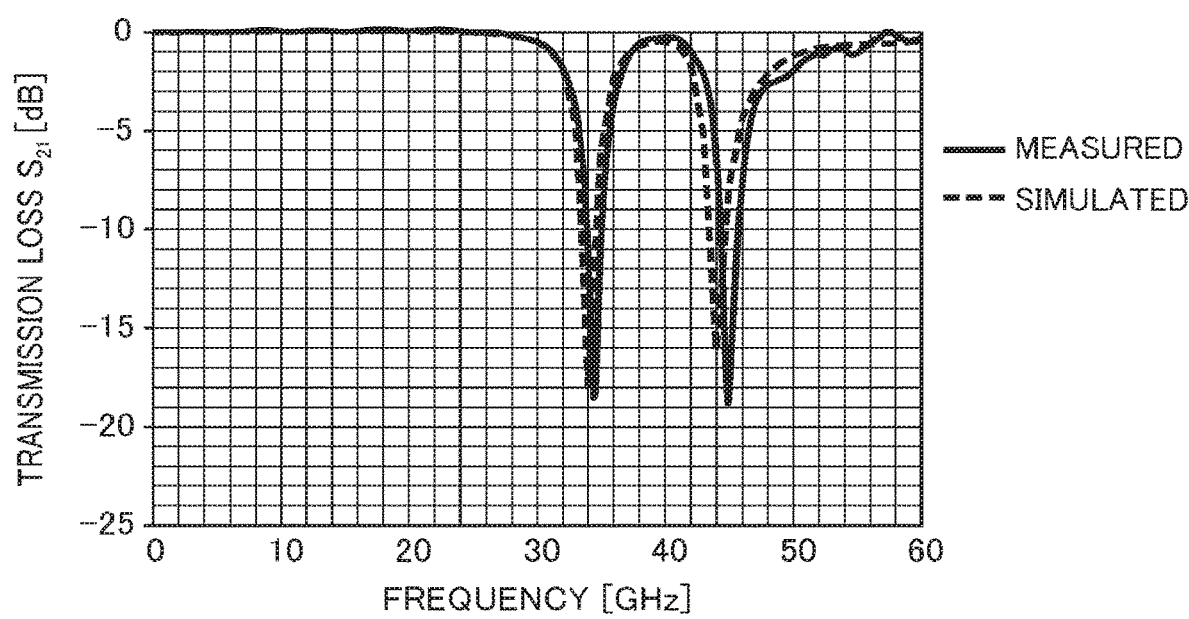
FIG. 19 is a graph showing a result of measurement of the transmission loss characteristic S21 of a high-frequency transmission line of Example 2.

A part from the input line to the signal line in each of the high-frequency transmission lines of Examples 1 and 2 was measured for transmission loss characteristic S21. The measurement was performed using Network Analyzer N5227B manufactured by Keysight Technologies, Inc. FIGS. 18 and 19 show the results of measurement of the transmission loss characteristics S21 of the high-frequency transmission lines of Examples 1 and 2, respectively. In FIGS. 18 and 19, the solid and broken lines indicate the results of the measurement and simulation, respectively. FIGS. 18 and 19 indicate that the results of measurement of the transmission loss characteristics S21 of the high-frequency transmission lines of Examples 1 and 2 well agree with the results of simulation.

Figure 20:
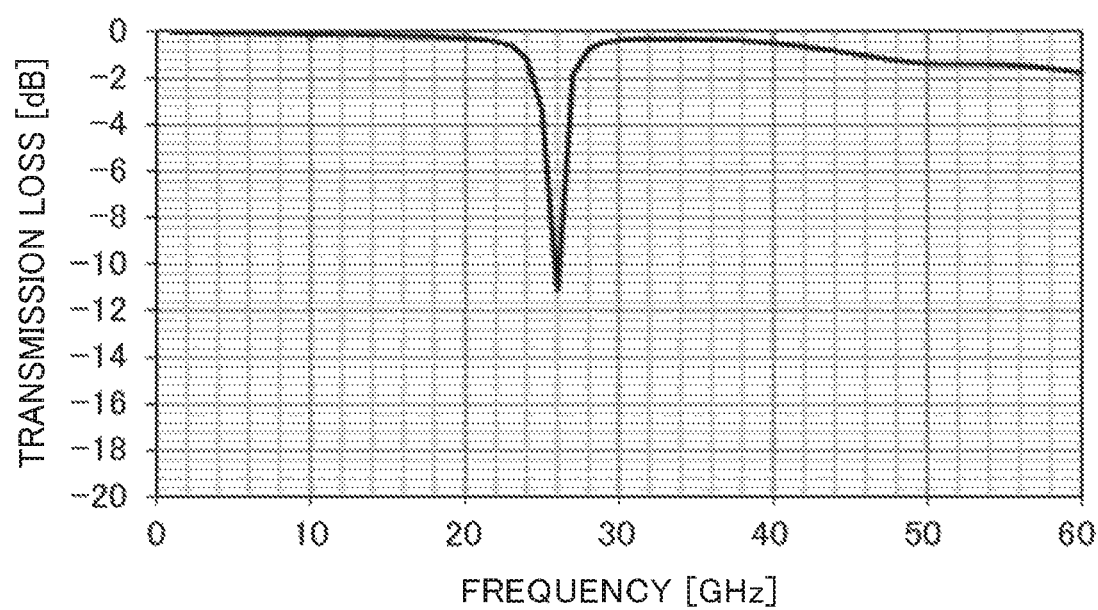
FIG. 20 is a graph showing a result of measurement of the transmission loss characteristic of a high-frequency transmission line of Example 3.

FIG. 20 shows the result of measurement of the transmission loss characteristic of the high-frequency transmission line of Example 3. The measurement result shown in FIG. 20 indicates that the high-frequency transmission line of Example 3 can be advantageously used to suppress a 26 GHz CW signal from a local oscillator in an on-vehicle 79 GHz band millimeter-wave radar device including: a local oscillator configured to generate a 26 GHz CW signal; and a multiplier configured to triple the CW signal. In such an application, the conductor arm and the conductor connector may be designed to suppress frequencies of 20 GHz or more so that the advantageous effects of the present invention can be achieved.

EXPLANATION OF REFERENCE NUMERALS

10: High-frequency IC
100, 200: High-frequency transmission line
110: Multilayer board
110i: Insulating layer
112: Signal via
113: Input line
114: Signal line
115: Ground via
116, 116U, 116M, 116L: Ground plane
118: Anti-pad region
120, 220, 320, 420, 520, 620, 720: Conductor arum
122: Conductor connector
125, 225, 325, 425, 525, 625, 725: Pad region

The invention claimed is:

1. A high-frequency transmission line configured to stack a plurality of conductor layers and an insulating layer, the high-frequency transmission line comprising:
a signal via that extends in a direction where the conductor and insulating layers are stacked and electrically connects the conductor layers to one another;
an input line that is provided in one of the conductor layers to input an electric signal to the signal via;
a signal line provided in another one of the conductor layers and connected to the input line through the signal via;
a ground plane that is provided in at least one of one of the conductor layers in which the input line is provided, another one of the conductor layers in which the signal line is provided, and a further one of the conductor layers provided between the one conductor layer and the another one conductor layer, is spaced apart from the signal via, and is connected to a reference potential;
a conductor arm provided in a spacing region between the signal via and the ground plane; and
a conductor connecter that is provided in the spacing region to connect the conductor arm and the ground plane, wherein
at a level of the ground plane, an outer edge of the signal via, a part of the spacing region, the conductor arm, and another part of the spacing region are arranged in this order in a direction from a center of the signal via to an outer edge of the spacing region, and
the conductor arm and the conductor connecter are configured to suppress a specific frequency electric signal of the electric signal.

2. The high-frequency transmission line according to claim 1, wherein a top view shape of the spacing region is substantially circular shape centered on the signal via.

3. The high-frequency transmission line according to claim 1, wherein in top view, the conductor arm has an arc shape centered on the signal via, and the conductor connector has a linear shape.

4. The high-frequency transmission line according to claim 1, wherein the conductor arm includes a plurality of conductor arms, and the conductor connector includes a plurality of conductor connectors.

5. The high-frequency transmission line according to claim 4, wherein the plurality of conductor arms and the plurality of conductor connectors include conductor arms and conductor connectors configured to have different shapes.

6. The high-frequency transmission line according to claim 4, wherein the plurality of conductor arms and the plurality of conductor connectors include conductor arms and conductor connectors configured to have the same shapes.

7. The high-frequency transmission line according to claim 4, wherein the plurality of conductor arms and the plurality of conductor connectors are arranged point-symmetrically centered on the signal via in top view.

8. The high-frequency transmission line according claim 1, wherein the ground plane is provided in the conductor layer that is different from the conductor layer in which the input line is provided and that is closest to the conductor layer in which the input line is provided.

9. The high-frequency transmission line according to claim 8, wherein the specific frequency is in a 20 GHz or more frequency band.

10. A wireless device comprising the high-frequency transmission line according to claim 1.

11. A radar device comprising the high-frequency transmission line according to claim 1.

12. The radar device according to claim 11, further comprising at least a transmitting antenna that transmits a transmission signal to outside, wherein
the high-frequency transmission line inputs the transmission signal, suppresses a specific frequency electric signal of the transmission signal, and outputs the transmission signal suppressed the specific frequency electric signal to the transmitting antenna.

13. The radar device according to claim 12, further comprising:
a local oscillator that generates the specific frequency electric signal; and
a multiplier that multiplies the specific frequency electric signal input from the local oscillator and then outputs the multiplied electric signal to poststage, wherein
the transmitting antenna poststage of the multiplier transmits the multiplied electric signal as the transmission signal to outside.

14. The radar device according to claim 13, wherein the multiplied electric signal has a 76 GHz or 79 GHz band.

\* \* \* \* \*